United States Patent
Fry et al.

(10) Patent No.: US 7,409,916 B2
(45) Date of Patent: Aug. 12, 2008

(54) METHOD AND EQUIPMENT FOR INTERSEEDING AN AREA OF GROUND TO CONVERT THE EXISTING VEGETATION OR TO IMPROVE THE QUALITY OF THE EXISTING VEGETATION

(75) Inventors: Jack Fry, Manhattan, KS (US); Randy Taylor, Stillwater, OK (US); Bob Wolf, Wamego, KS (US); Dick Stuntz, Lawrence, KS (US)

(73) Assignee: Kansas Statue University Research Foundation, Manhattan, KS (US)

( * ) Notice: Subject to any disclaimer, the term of this patent is extended or adjusted under 35 U.S.C. 154(b) by 443 days.

(21) Appl. No.: 11/189,992

(22) Filed: Jul. 26, 2005

(65) Prior Publication Data

US 2006/0016375 A1    Jan. 26, 2006

Related U.S. Application Data

(60) Provisional application No. 60/591,015, filed on Jul. 26, 2004.

(51) Int. Cl.
| | |
|---|---|
| A01C 5/00 | (2006.01) |
| A01C 7/00 | (2006.01) |
| A01C 7/18 | (2006.01) |
| A01C 9/00 | (2006.01) |
| A01C 13/00 | (2006.01) |

(52) U.S. Cl. .................. 111/121; 111/127; 111/53; 111/163; 111/174; 111/194; 111/900; 111/901
(58) Field of Classification Search ......... 111/120–127, 111/52–70, 134–137, 79–81, 157, 174, 163–170, 111/190, 194, 195, 900, 901; 172/604
See application file for complete search history.

(56) References Cited

U.S. PATENT DOCUMENTS

| | | | | |
|---|---|---|---|---|
| 1,563,261 | A | * | 11/1925 | Curtis ..................... 172/456 |
| 4,103,628 | A | * | 8/1978 | Gaston ..................... 111/52 |
| 4,436,040 | A | | 3/1984 | Chumley |
| 4,579,071 | A | * | 4/1986 | Johnson ................... 111/195 |
| 4,694,641 | A | * | 9/1987 | Porter ..................... 56/328.1 |
| 4,821,655 | A | | 4/1989 | Rizzo |
| 5,396,962 | A | | 3/1995 | Reincke |
| 5,802,994 | A | | 9/1998 | Kinkead et al. |
| 6,116,519 | A | * | 9/2000 | Williamson .............. 239/168 |
| 6,347,593 | B1 | | 2/2002 | Moran et al. |
| 6,367,561 | B1 | * | 4/2002 | Firdaus ..................... 172/60 |
| 2002/0152675 | A1 | * | 10/2002 | DuBois et al. ............ 47/1.5 |

* cited by examiner

*Primary Examiner*—Christopher J. Novosad
(74) *Attorney, Agent, or Firm*—Hovey Williams LLP

(57) ABSTRACT

Methods and apparatus for interseeding an area of ground having existing vegetation growing thereon are provided. The interseeder apparatus tills a plurality of spaced-apart rows in the ground, deposits seed in the exposed soil of the rows, compacts the seed into the rows, and optionally, sprays at least a portion of the exiting vegetation adjacent the rows with a herbicide so as to reduce competition for the new seedling.

18 Claims, 6 Drawing Sheets

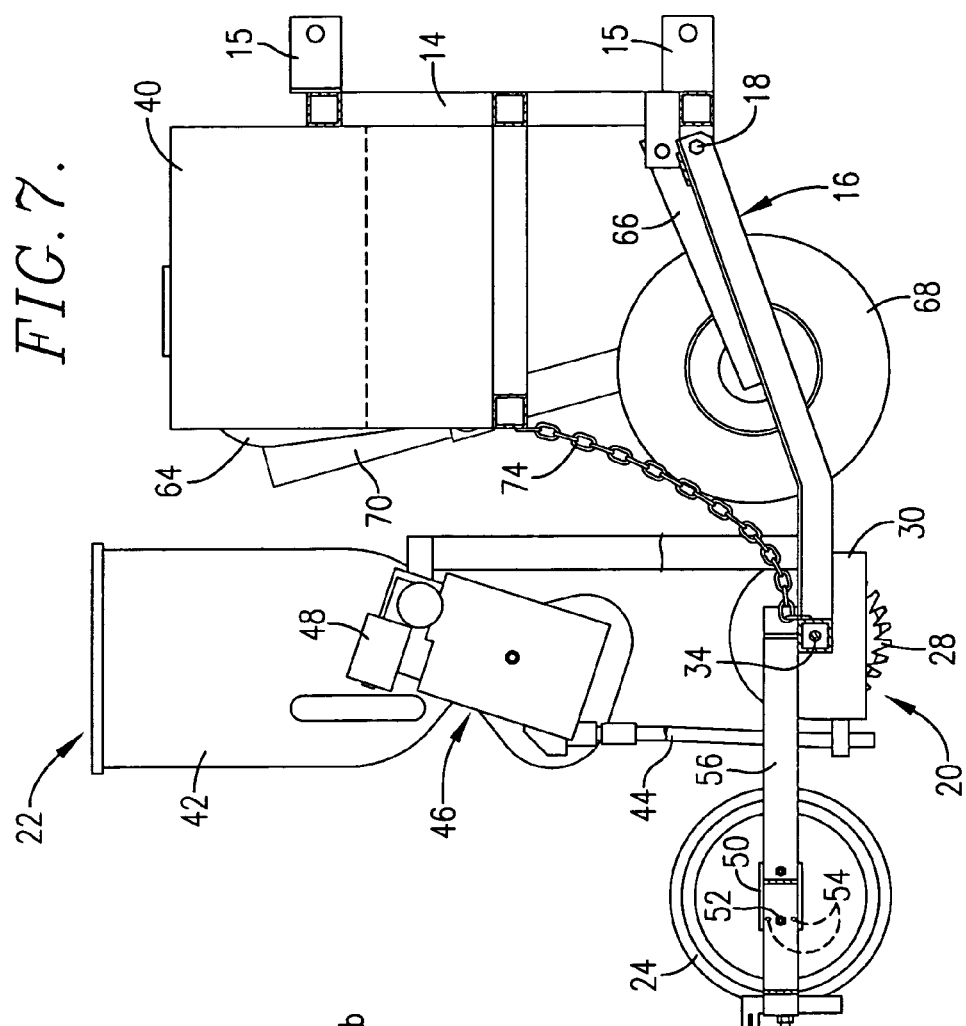
FIG. 7.
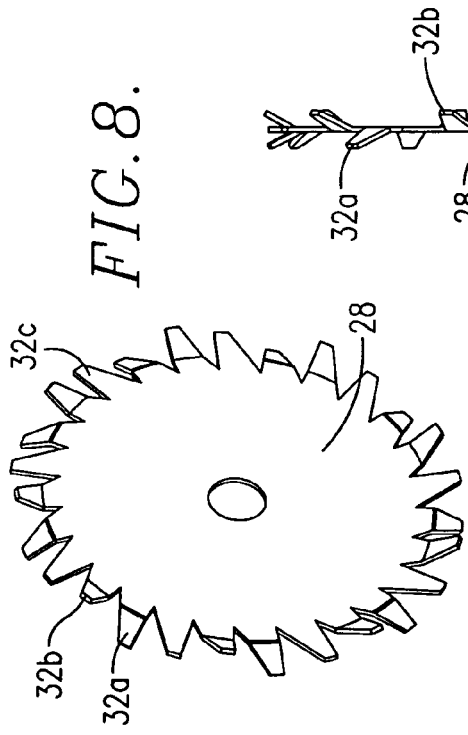
FIG. 8.
FIG. 9.
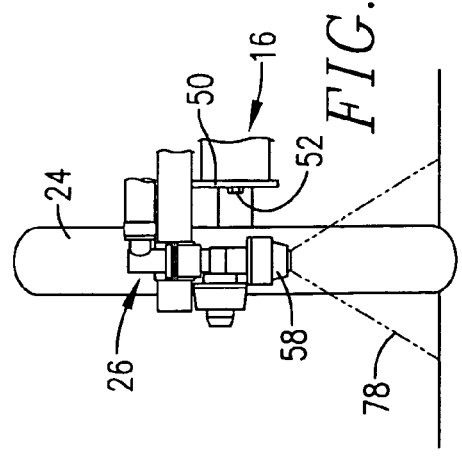
FIG. 10.

METHOD AND EQUIPMENT FOR INTERSEEDING AN AREA OF GROUND TO CONVERT THE EXISTING VEGETATION OR TO IMPROVE THE QUALITY OF THE EXISTING VEGETATION

RELATED APPLICATION

The present application claims the priority of U.S. Provisional Patent Application Ser. No. 60/591,015, filed Jul. 26, 2004, which is incorporated by reference herein.

BACKGROUND OF THE INVENTION

1. Field of the Invention

The present invention is generally directed toward apparatus and method for introducing seed into an existing stand of vegetation in a manner that will replace or improve the quality of the existing vegetation. More specifically, the present invention maximizes the germination and growth of newly introduced seed without removal of the existing plant variety.

2. Description of the Prior Art

In certain circumstances, it may be advantageous to convert an existing area of vegetation to new vegetation. For example, the turf used on golf courses, athletic fields, lawns or parks may be replaced to take advantage of new plant varieties more suited to a particular climate, use or care requirements.

Different climate zones exist throughout the world. Plant species that grow and thrive in one climate zone may not survive if planted in a climate zone to which they have not adapted. For example, grasses commonly used on cool-season lawns, such as Kentucky bluegrass, do not tolerate the hot summers of the southern U.S. and are not grown there. Likewise, warm-season grasses, such as bermudagrass, cannot be grown in the northern U.S. The area between what is commonly understood to be a cool climate zone (north of about 40° latitude in the U.S.) and a warm climate zone (south of about 34° latitude in the U.S.) is generally referred to as a climate transition zone. The climate in this area is characterized by extreme periods of hot and cold temperatures as well as periods of frequent precipitation and lack of precipitation.

Because the climate in the transition zone is characterized by these temperature and moisture variations, it can be difficult to maintain plant species that can survive the temperature and moisture extremes. It is common for golf course superintendents and other turfgrass managers in the transition zone to grow cool-season grasses that can survive the cold winter months. However, these grasses often require large water and pesticide inputs to survive during summer months.

Several new varieties of seeded warm-season grasses have recently become available that provide good turf quality during hot summer temperatures and require significantly less water and pesticide inputs than cool-season grasses. These new warm-season grasses can also survive the cold winter months. Transitioning from the use of cool-season grasses to the newer varieties of warm-season grasses can have a positive environmental impact by reducing water and fertilizer use. In addition, the resulting reduction in fertilizer and water use also provides economic benefit.

Turfgrass managers wanting to convert cool-season turfs to seeded warm-season turfs currently have several options. Warm-season grasses can be seeded directly into the existing stand of cool-season grasses with no seedbed preparation. This approach results in little seed germination and may require many years for complete conversion. Another option is to kill existing vegetation by application of a non-selective herbicide and then overseeding the area. However, this method requires the application of a large amount of seed. Further, the applied seed generally lies upon the soil surface and can lead to inefficient seed germination and a long conversion process. Yet another option is to replace strips (approximately 4-inches wide) of existing turf with new sod. This is a relatively expensive and time consuming method. Still another option is to insert sprigs of grass into the existing turf and allowing the sprigs to grow laterally and eventually out compete the existing vegetation. While effective, this method is still relatively expensive. Lastly, the entire area can be sodded with new vegetation, however, this is the most expensive alternative.

Currently, conversion by seeding is usually accomplished by the complete removal of the existing turf, either by roto-tilling or through the use of a non-selective herbicide to kill the existing cool-season turf. Warm-season seed is then broadcast over the prepared surface. The removal of the existing turf requires that the area being converted be closed for use until the new seed can be established which can often last for several months. For golf courses, this results in course closure and a significant loss of revenue. It would be most desirable if the area could remain open for use or play during the period when cool-turf areas are being converted to seeded warm-season grasses.

As an alternative to replacement, existing vegetation stands oftentimes need to be improved. Alfalfa is a herbaceous perennial legume that is distributed worldwide and accounts for nearly thirty million acres of production in the United States. Alfalfa produces a highly palatable feed that is prized as a primary component of dairy cattle rations. It is also an important feed for horses, beef cattle and sheep because of its high content of protein, vitamins and minerals.

After seeding, alfalfa stands can remain productive for about four to ten years or even longer. As stands become older, the plant populations decrease along with the overall feed value of the product. When this occurs, renovation or rejuvenation of the crop becomes necessary. Although current practice commonly calls for alfalfa to be grown in a crop rotation program with grain crops, many alfalfa producers who raise crops on soils that are marginal for commercial grain productions would prefer a method that allows for continuous alfalfa production. Attempts at inter-seeding or drilling more seed as the crop begins to decline have been unsuccessful due to the effects that crowding, shading, and auto-toxicity have on new seedlings that are planted with traditional seeding equipment. Current conventional disc or hoe opener seeding equipment do little more than place seed in small slits or scarifications along the ground. Such equipment, often referred to as "slit-seeders," slice very narrow furrows (⅛ inch wide) with variable spacing (0.5-2 inches) into the existing stand of vegetation and drops seed into these depressions. Seedlings from slit-seeders come up within a stand of dense existing vegetation and are unable to compete with the existing plants.

There is a need in the art for a method of converting cool-season turf areas to seeded warm-season grasses in a manner that uses less seed, increases germination rate and survival, and allows the cool-season turf area to remain open for use or play during the conversion period. There is also a need in the art for a method of improving the quality of existing vegetation by thickening marginal stands of existing vegetation.

SUMMARY OF THE INVENTION

The present invention overcomes the above problems by providing methods and apparatus for interseeding areas of ground having existing vegetation growing thereon so as to improve the quality of the existing vegetation or replace the existing vegetation with another variation. Accordingly, in one embodiment of the present invention there is provided a method of interseeding an area of ground having existing vegetation growing thereon comprising the steps of: tilling a plurality of spaced-apart rows in the ground thereby exposing the soil; depositing seed in the exposed soil of said rows; compacting said seed into the exposed soil; and spraying at least a portion of the existing vegetation adjacent said rows with a herbicide.

In another embodiment, the present invention provides a method of interseeding an area of ground having existing vegetation growing thereon comprising the steps of: disturbing the ground using a plurality of rotatable cutting devices to form a plurality of spaced-apart rows, each of said rows being between about 0.5-4 inches wide and up to about 1 inch deep, said rows being spaced about 4 to about 24 inches apart; depositing seed into said rows; and passing at least one roller over said rows to compact said seed into said rows.

In yet another embodiment of the present invention there is provided an apparatus for interseeding an area of ground having existing vegetation growing thereon comprising: a plurality of rotatable cutting devices that when rotated while in contact with the ground form a plurality of spaced-apart rows in the ground; at least one seeder for depositing seed in said plurality of spaced-apart rows; at least one roller for compacting said seed into the ground; and at least one spray nozzle for applying a chemical agent to at least a portion of the ground adjacent said rows.

BRIEF DESCRIPTION OF THE DRAWINGS

FIG. 6 is a cross-section view of the interseeder taken along line 6-6 of FIG. 3.

FIG. 7 is a cross-section view of the interseeder taken along line 7-7 of FIG. 1.

FIG. 8 is a perspective view of a tilling blade used with the interseeder.

FIG. 9 is an end elevation view of the tilling blade shown in FIG. 8.

FIG. 10 is a detailed view of the spray nozzle and spray pattern produced therefrom.

FIG. 11 is a top plan view of an area of ground treated with the interseeder.

DETAILED DESCRIPTION OF THE PREFERRED EMBODIMENT

Figure 1:
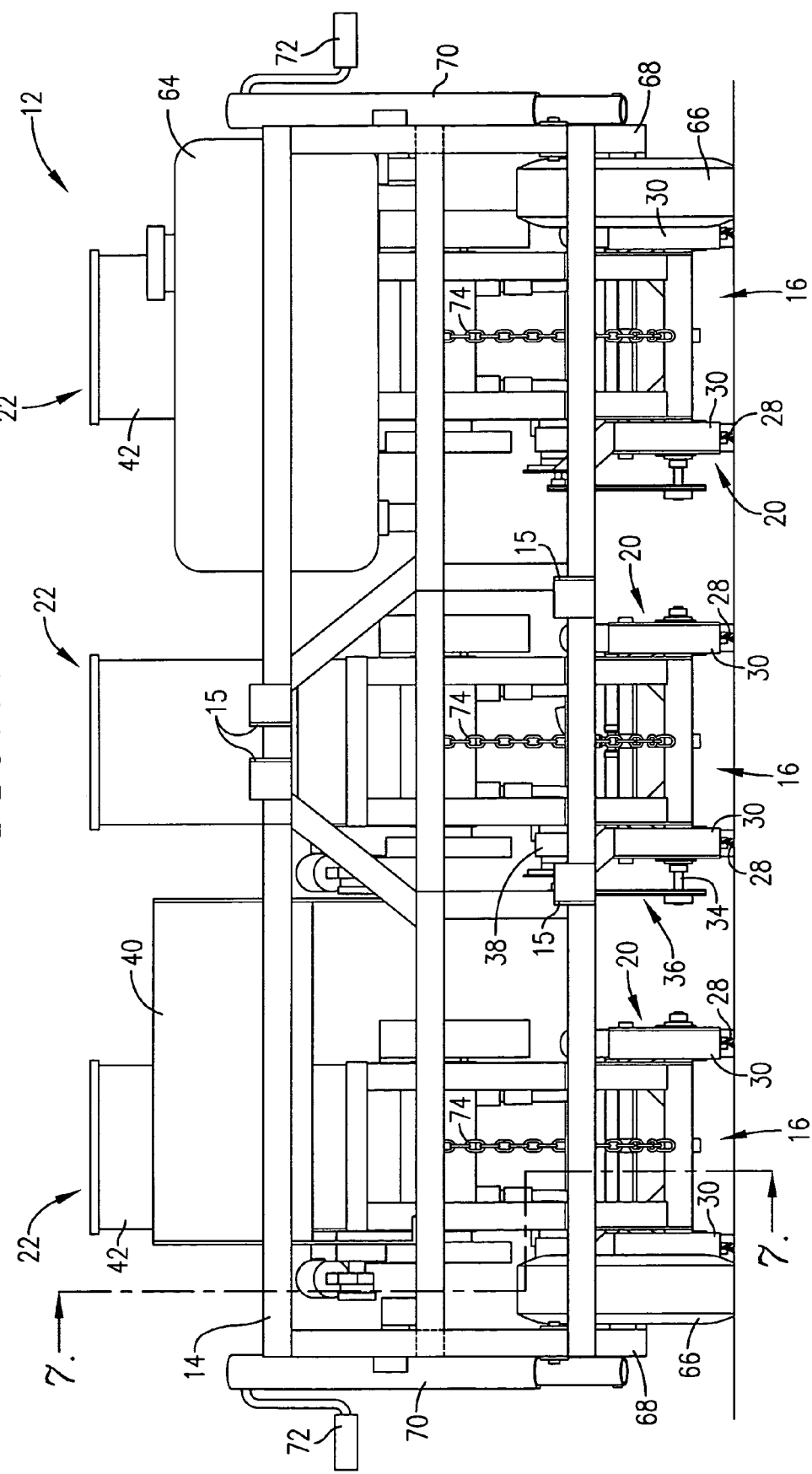
FIG. 1 is a front elevation view of a preferred interseeder apparatus in accordance with the invention.

Turning first to FIG. 1, an interseeder 12 is provided that generally comprises a frame 14 that can be attached to and pulled behind a tractor (not shown). As used herein, the term "interseed" refers to the process of inserting or depositing seed into an existing vegetation stand. Thus, the term "interseeder" refers to an apparatus or device for accomplishing this task. Frame 14 is preferably configured for attachment to a three-point hitch of a tractor at points 15.

Figure 2:
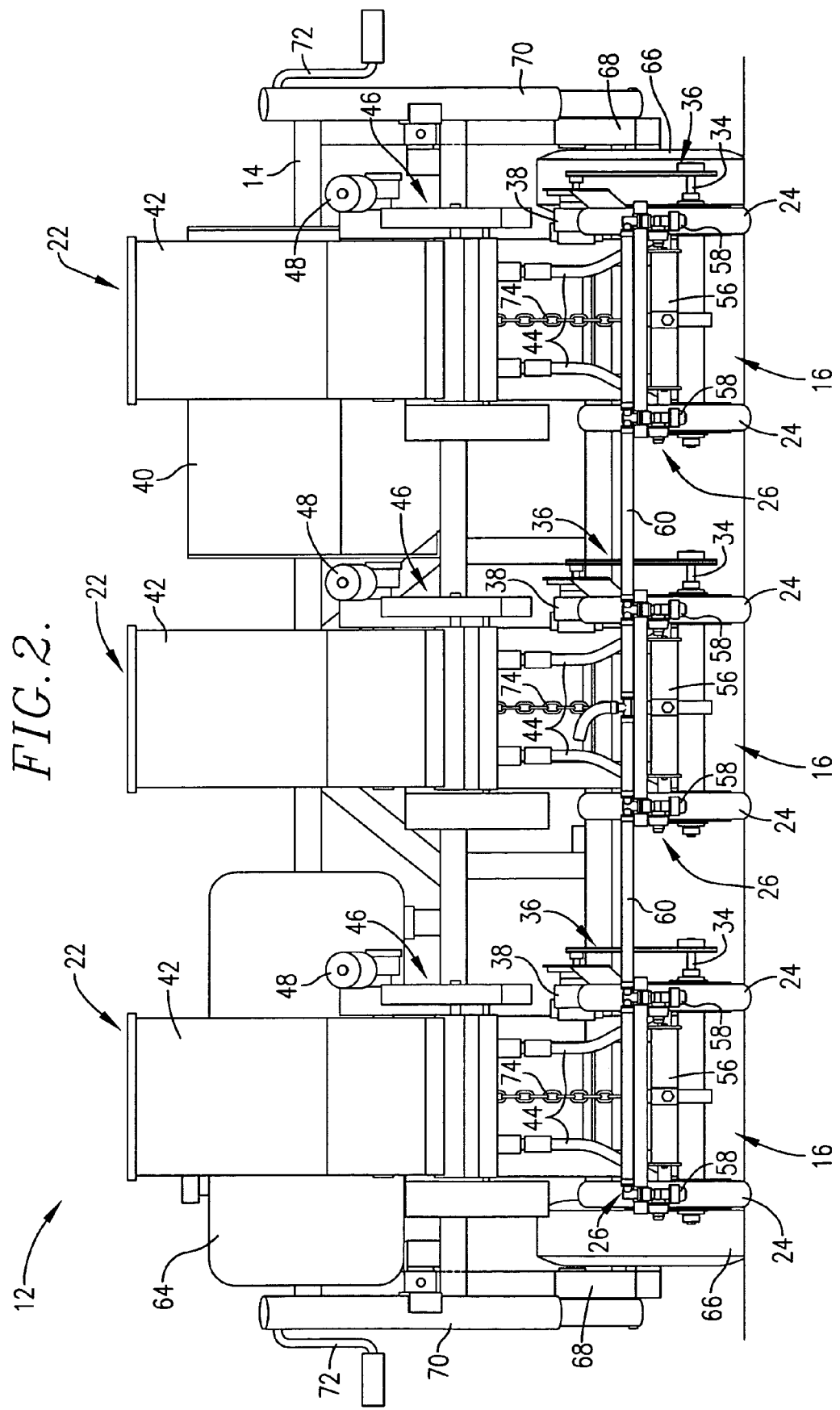
FIG. 2 is a rear elevation view of the interseeder.
Figure 3:
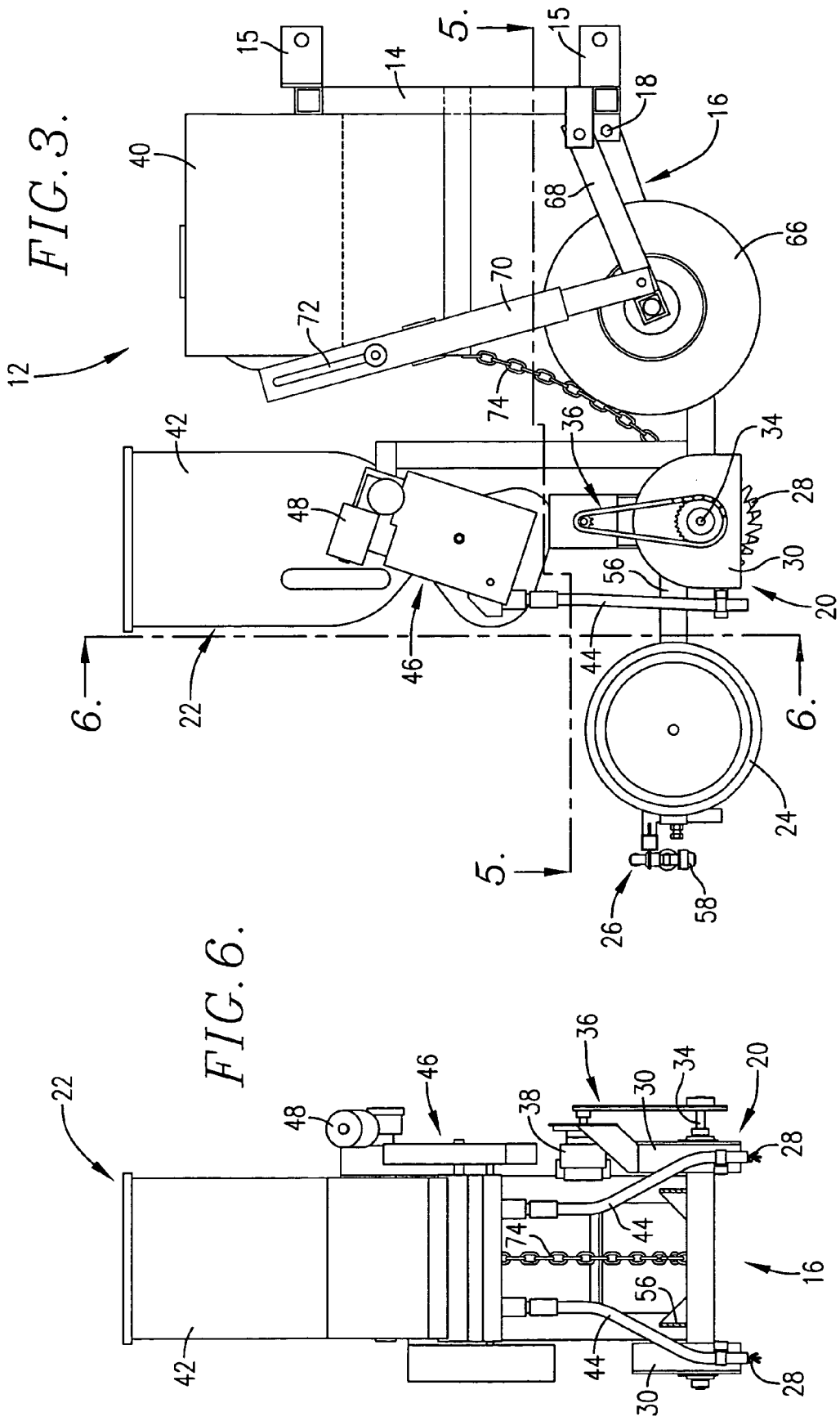
FIG. 3 is a right end elevation view of the interseeder.
Figure 4:
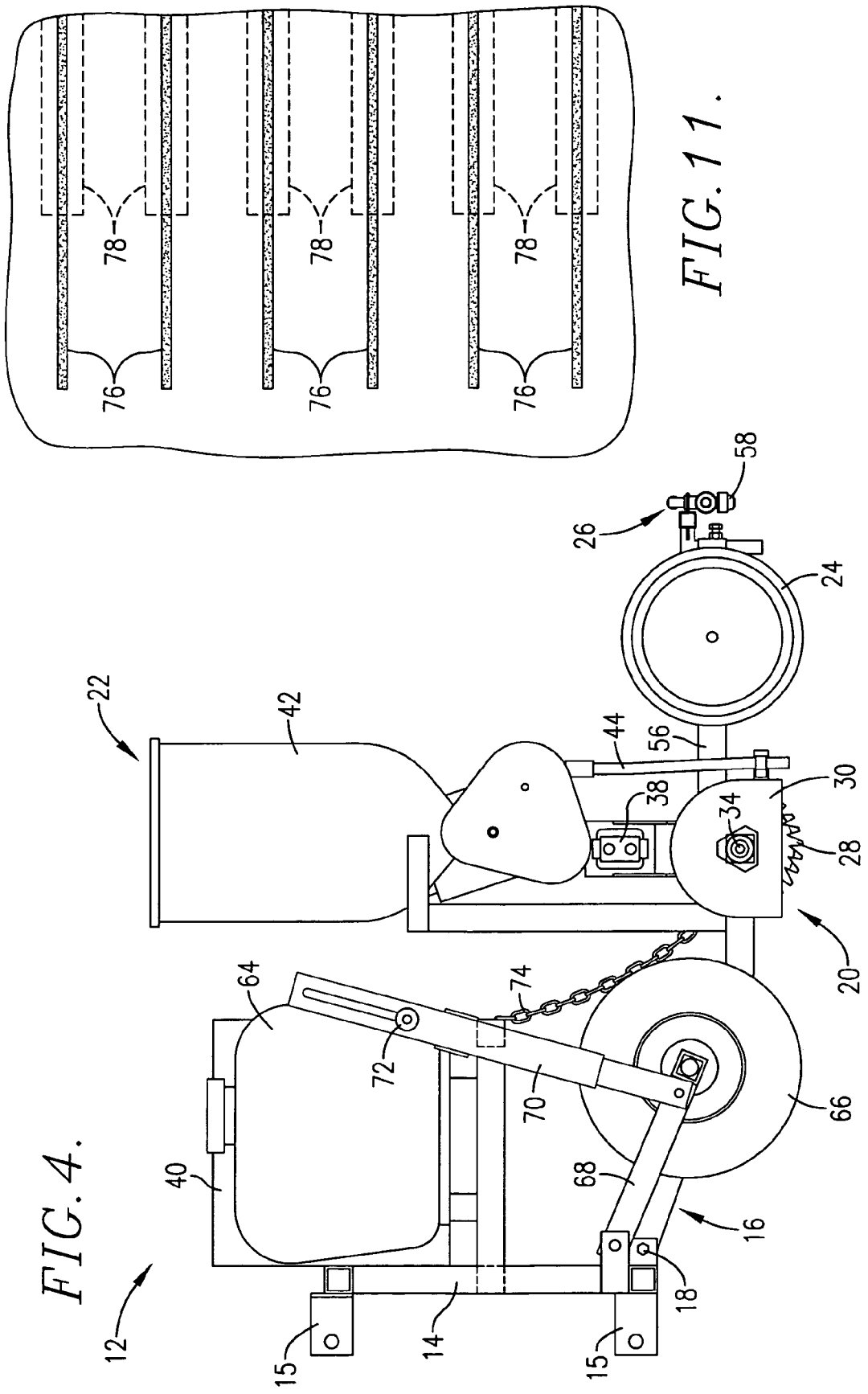
FIG. 4 is a left end elevation view of the interseeder.
Figure 5:
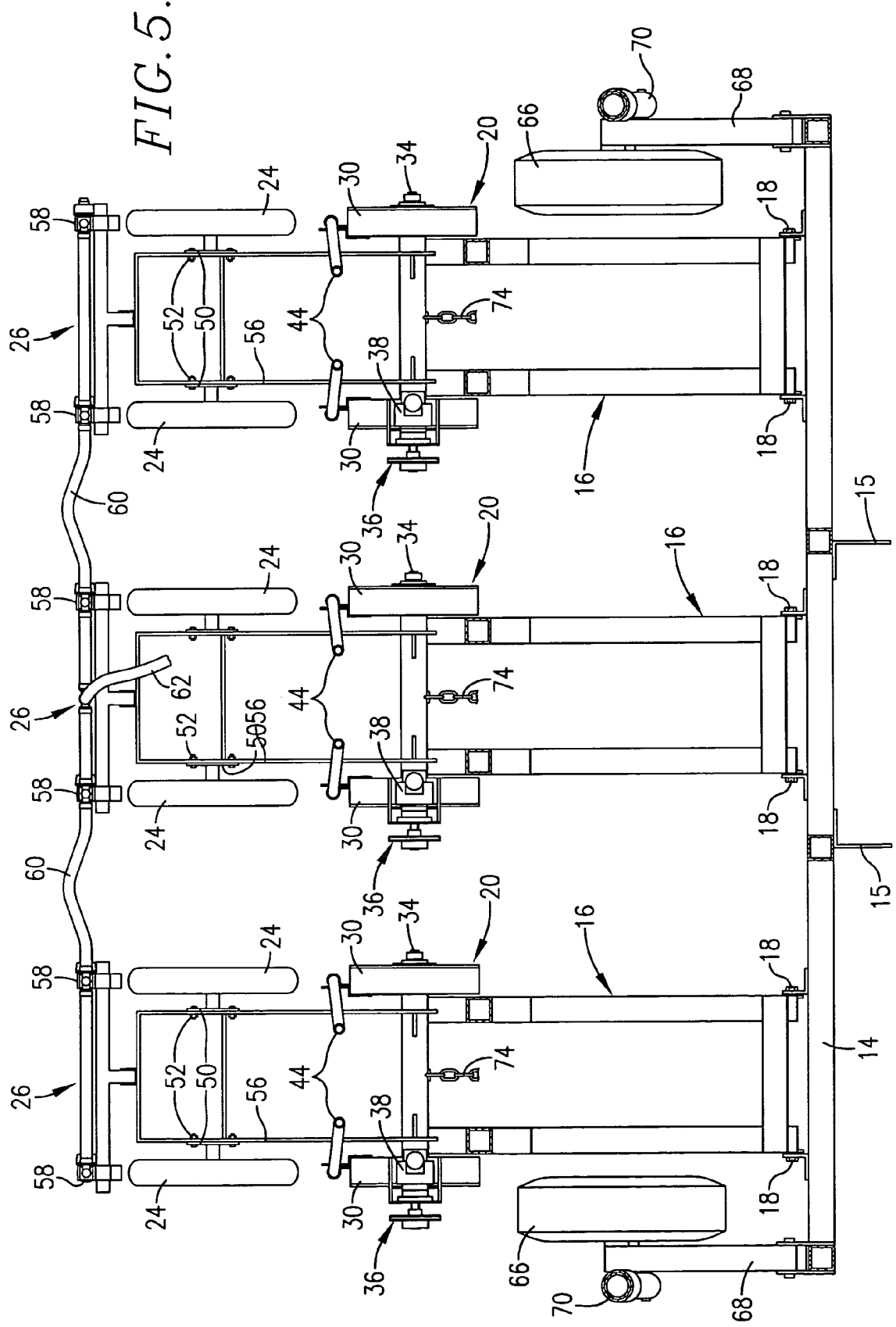
FIG. 5 is a cross-section view of the interseeder taken along line 5-5 of FIG. 3.

As shown in FIG. 2, three independently shiftable tilling assemblies 16 are attached to frame 14. As more clearly seen in FIG. 5, tilling assemblies 16 are pivotally coupled to frame 14 at joints 18. This independent coupling allows each tilling section 16 to follow the contour of the ground, particularly when traversing an uneven surface. As shown in FIGS. 3 and 4, each tilling section comprises a cutting assembly 20, a seeder 22, a pair of seed-compacting rollers 24, and a sprayer assembly 26.

Cutting assembly 20 comprises a pair of cutting blades 28 housed inside shrouds 30. As shown in FIGS. 8 and 9, blade 28 is substantially discoid in shape and comprises a plurality of teeth 32($a$-$c$). At least some teeth 32$a$ extend obliquely away from blade 28 in a first direction, while at least some other teeth 32$b$ extend obliquely away from blade 28 in a second direction different from the first direction. Also, it is possible that some teeth 32$c$ are substantially coplanar with blade 28. In preferred embodiments teeth 32, 32$a$, and 32$b$ are arranged in an alternating pattern so as to provide maximum cutting efficiency. Preferably, blade 28 presents a diameter of about 6 to about 24 inches, more preferably from about 8 to about 20 inches, most preferably from about 10 to about 16 inches. The individual teeth 32 are generally about 0.5 to about 3 inches in length, more preferably from about 1 to about 2 inches. Teeth 32$a$ and 32$b$ preferably laterally extend about 0.25 to about 2 inches from the plane of blade 28, more preferably from about 0.5 to about 1 inch. This lateral extension has an ultimate bearing on the width of the rows that are tilled in the ground. Blades 28 are substantially evenly spaced along the entire width of interseeder 12. Typically, blades 28 are spaced about 4 to about 24 inches apart, more preferably from about 8 to about 20 inches, and most preferably from about 10 to about 18 inches. However, it is within the scope of the present invention for the space between blades to vary across the width of interseeder 12.

Each pair of blades 28 on a particular cutting assembly 20 are coupled by an axle 34 which is rotated by drive assembly 36. Blades 28 preferably rotate in a direction opposite to the direction of travel of interseeder 12. Drive assembly 36 is powered by a hydraulic motor 38 that is coupled to a hydraulic fluid reservoir 40 which is coupled to a hydraulic pump attached to the tractor's power take-off (PTO). Such fluid couplings have been omitted from the drawings for ease of illustration. Thus, the speed at which blades 28 are turned may be controlled by the tractor's PTO system. In alternate embodiments, an electric motor or an internal combustion motor may be provided in place of hydraulic motor 38 thereby eliminating the need for fluid reservoir 40.

Seeder 22 generally comprises a seed bin 42 having an internal auger (not shown) for controlling delivery of seed to conduits 44. The outlets of conduits 44 are preferably positioned directly aft of blades 28 (see, FIG. 6) so that seed may be deposited in the soil exposed through the operation of blades 28. The outlets of conduits 44 are clamped to shrouds 30 in order to secure them in place. Seed delivery from bin 42 is controlled by the internal auger. The auger is driven by a seeder drive assembly 46 which comprises an electric motor 48. Motor 48 is powered by the tractor's battery and may be controlled via a switch installed on the tractor.

A pair of rollers 24 are provided aft of the cutting blades 28 and seed conduits 44 for compacting seed into the exposed soil. The height of rollers 24 is adjustable by shifting plate 50 and re-securing it with a pin 52 through any of holes 54 formed in roller support member 56. See, FIG. 7.

Each sprayer assembly 26 is coupled to a corresponding support member 56 on each respective tilling section 16. Sprayer assembly 26 comprises two spray nozzles 58 positioned directly aft of rollers 24. Nozzles 58 that are adjacent nozzles located on other tilling sections 16 are coupled with a flexible conduit 60. In this manner, all nozzles 58 are interconnected and supplied by a common feed line 62. Feed line 62 is connected to a reservoir 64 that is mounted on frame 14 and contains a chemical agent to be applied to the ground during operation of interseeder 12.

The cutting depth of blades 28 is set by adjusting the position of wheels 66. Wheels 66 are pivotally coupled to frame 14 by arms 68. Jack assemblies 70 are coupled to arms 68 and frame 14. Turning hand crank 72 shifts the position of arm 68 relative to frame 14, thus raising or lowering wheels 66. In alternate embodiments, jack 70 may be electronically controlled so that the tractor operator can adjust the cutting depth of blades 28 without dismounting the tractor.

A safety chain 74 extends from each tilling section 16 back to frame 14 to provide additional security should joints 18 fail and a section 16 becomes separated from frame 14.

In operation, interseeder 12 introduces seed to a plot of ground having existing vegetation growing thereon by first disturbing the soil to create a plurality of spaced-apart rows and then depositing new seed into the exposed soil of the rows. Interseeder 12 can be used to improve the quality of the existing vegetation by thickening marginal stands or to introduce a new species of vegetation into the stand. Preferably, interseeder 12 is used to convert a grass field (e.g., football, soccer, or baseball field) or golf course fairway from cool-season grass to a warm-season grass. For example, fairways containing bent, rye, or bluegrass can be interseeded with bermudagrass or zoysia which require less water, less maintenance, and are usually less susceptible to disease.

Initially, the cutting depth of blades 28 is set by adjusting jack assemblies 70 as described above. Preferably, blades 28 are adjusted so as to create a cutting depth of up to about 1 inch, and more preferably up to about 0.5 inches. It is essential to set the cutting depth so that the underlying soil becomes exposed. Generally, a depth setting of between about 0.25 to about 0.5 inches is sufficient.

Next, the tractor's PTO is switched on thereby activating hydraulic motors 38 and causing blades 28 to rotate. Interseeder 12 is lowered into contact with the ground using the tractor's three point hitch. More specifically, wheels 66 and rollers 24 rest upon the ground while blades 28 cut into the ground to the predetermined depth.

As the tractor moves forward, a plurality of rows 76 are formed in the ground by blades 28. See, FIG. 11. At the same time, seeders 22 are activated so that seed is delivered from bins 42 through conduits 44 and deposited in rows 76. Preferably, the seed being deposited is mixed with a fertilizer or other carrier material in order to more effectively control the seed delivery rate. As grass seed comprises relatively fine particles, it has been discovered that more consistent and less wasteful seed delivery is achieved when the grass seed is combined with a larger, particulate material. Preferably, the grass seed is mixed with a low-analysis organic fertilizer at a ratio of about 7 parts fertilizer to about 1 part seed.

After the seed is deposited in the exposed soil of rows 76, rollers 24 pass on top of rows 76 thereby compacting the seed into the row to ensure good seed-soil contact. It is within the scope of the invention for this compacting step to be the final operation. The seed may then be watered using conventional irrigation systems and allowed to germinate. However, it is preferably to further treat the existing vegetation adjacent rows 76 with a chemical agent, particularly a non-selective herbicide, especially a glyphosate-containing herbicide such as Roundup®, in order to reduce competition for the germinating seed.

In this regard, sprayer assembly 26 is activated to deliver the chemical agent from reservoir 64 to spray nozzles 58. As shown in FIG. 10, nozzles 58 preferably produce a spray pattern 78 that spreads the chemical agent on top of rows 76 and the adjacent existing vegetation. The spray patterns of nozzles 58 are such that the spray pattern of one nozzle does not touch upon or overlap the spray pattern of an adjacent nozzle. Thus, less than the entire space between adjacent rows is being sprayed with the chemical agent, more preferably less than 50% of the space between rows are being sprayed. The width of the spray pattern 78 is determined largely by the width of the row 76 and the space between adjacent rows. Preferably, the width of the spray pattern is between about 1.5 to about 5 times the width of the tilled row 76. Generally, the spray pattern is between about 2 to about 10 inches wide, more preferably between about 3 to about 8 inches, and most preferably between about 4 to about 6 inches.

The herbicide preferably kills the vegetation adjacent rows 76, but does not affect the newly deposited seed. This creates a buffer zone between the existing vegetation and the new growth giving the seedlings a much greater chance of survival. Once established, the newly introduced vegetation spreads laterally to eventually become the primary and predominant vegetation in the stand. Generally, substantially the entire stand may be converted in less than three, and preferably two, growing seasons. If the newly planted seed is of the sane variety as the existing vegetation, the reduced competition allows the new plants to become heartier and greatly improves the overall health of the stand.

The interseeder 12 accomplishes soil disturbance, seeding, compacting, and herbicidal treatment in a single pass as opposed to multiple passes with different equipment. During the interseeding process, normal activities on the turf may continue substantially uninterrupted. Preferably, between about 5% to about 30% of the ground is disturbed during interseeding operations, more preferably between about 8% to about 25%, and most preferably between about 10% to about 20%, depending upon the treatment method used (i.e., with spraying or without spraying). Because less soil disturbance occurs, methods according to the present invention generally require less seed and less labor in establishing the new growth. The interseeder deposits seed directly in the linear seedbed rows and eliminates the need to broadcast seed over the entire areas. Up to about 87% less seed (weight basis) is generally required with the present interseeding method. Soil erosion is also greatly reduced when compared to traditional tilling methods due to the retention of at least some existing vegetation.

EXAMPLE

The following example depicts the conversion of a ryegrass plot to bermudagrass. It is to be understood, however, that this example is provided by way of illustration and nothing therein should be taken as a limitation upon the overall scope of the invention.

This study was performed on a mature stand of perennial ryegrass maintained under golf course fairway conditions. The stand was mowed at a height of 0.5 inches, fertilized with 3 lbs. of N per 1000 sq. ft. per year, and irrigated to prevent drought stress. Individual plots measured 6 feet by 6 feet and were arranged in a randomized complete block design with four replicates. The individual plots were subjected to one of the following treatments: glyphosate treatment, scalping, planting with the present interseeder apparatus, planting with the interseeder apparatus with rows being oversprayed with glyphosate, and an untreated control.

Coated "Riveria" bermudagrass seed was obtained from Johnston Seed Co., Enid, Okla. The label indicated that the purity was 51% and germination 85%. Hence, the pure live seed (PLS) contained was 43%. Glyphosate was applied to the selected plots at the label recommended rate. One week later, the turf in the scalping treatment was mowed three times weekly at 0.25 inches for four weeks after which a regular fairway-height schedule began.

Prior to planting, all plots except those being treated with the interseeder apparatus were core aerified (12 holes per sq. ft., approximately 1 inch deep) and verticut (four passes). Bermudagrass seed was mixed with approximately 300 grams Milorganite (6-2-0) and spread at 1.5 lbs. PLS/1000 sq. ft. in each plot using a shaker bottle.

The interseeder was set to disturb four, two-inch wide rows, 15 inches apart along the entire length of each plot. This resulted in disturbance of approximately 4 sq. ft. in each plot or 11% of the entire plot area. Bermudagrass seed was mixed with approximately 100 grams Milorganite and applied at 2.38 lbs. PLS/1000 sq. ft. in rows. A shaker bottle was modified to include a 0.25-inch diameter tube in its lid to deliver the seed mixture in a narrow row. In one of the interseeder treated plots, glyphosate was applied over the rows immediately after seeding. Application was performed with a backpack sprayer to eliminate ryegrass 1 inch in either direction of the row.

After seeding, irrigation was applied 2-3 times daily during the first four weeks to provide a total of about 1 inch of water in each session. After four weeks, irrigation was applied every 1-2 days to prevent bermudagrass stress. Nitrogen from urea was applied at 1 lb. N/1000 sq. ft. three times with three weeks between each treatment.

Data was collected on bermudagrass coverage and turf quality. A modification of the vertical point quadrant method was used to determine bermudagrass coverage within each treatment plot after growth had ceased in October. The vertical point quadrant was constructed of a PVC frame with an internal monofilament grid spaced on 4-inch centers. The grid was placed over each plot to estimate coverage in each treatment. The presence of any part of a bermudagrass plant under an intersection was recorded as a hit. To determine percent coverage, the number of hits was divided by the number of intersections on the grid. Turf quality was rated weekly on a scale of 0-9 where 0=brown, dead turf; 7=acceptable quality for a golf course fairway; and 9=optimum color, density and uniformity. Quality data for each month was averaged and analyzed using the Statistical Analysis System. The analysis variance (ANOVA) procedure was used to test for treatment effects. Means were separated using Tukey's least significant difference test (LSD). The results are shown in Table 1.

TABLE 1

| Treatment | Coverage (%) October | Turf Quality July | August | September | October |
|---|---|---|---|---|---|
| Glyphosate | 100 | 1.1 | 7.3 | 8.7 | 9.0 |
| Scalping | 87 | 5.3 | 7.1 | 7.1 | 6.5 |
| Interseeder | 41 | 5.9 | 7.1 | 5.2 | 5.3 |
| Interseeder + glyphosate | 56 | 3.5 | 4.5 | 5.0 | 4.0 |
| Untreated | 12 | 7.9 | 7.8 | 7.1 | 6.6 |

Complete bermudagrass coverage in the first season was attained by treating entire plots with glyphosate. Visual observations indicated that complete coverage had occurred within 4-5 weeks after seeding. Treatment with the interseeder, although disturbing only 11% of the plot at planting, resulted in 41% coverage by October. Application of the glyphosate spray resulted in an additional loss of 11% of the plot area (22% total) and a 15% increase in coverage compared to treatment with the interseeder alone.

Poorest turf quality in the initial month was observed for the plots treated entirely with glyphosate. In August, quality ratings were similar except for the turf treated with the interseeder and glyphosate. In September and October, plots treated entirely with glyphosate received the highest ratings. The other plots, including the untreated plots, were less uniform due to the presence of random or linear arrangements of bermudagrass.

The most rapid, and also most destructive, method for converting ryegrass to bermudagrass is to treat the entire area with glyphosate. However, golf course closure would be required. Such closures would result in a loss of revenue during this period. The present interseeder is a less destructive alternative and allows conversion to take place with up to about 87% less seed being used (on a per acre weight basis using the interseeder spacing evaluated in this test) compared to broadcasting seed over the entire area. Although complete coverage was not achieved in the first season using the interseeder, bermudagrass will encroach into the remaining plot area in the second season.

Among the greatest benefits of the interseeder is the cost savings which accompany the conversion. Assuming a hypothetical one-acre golf course fairway measuring 90×484 feet, a comparison in seed requirements can be made between a traditional broadcast method of planting and planting with the interseeder. Broadcasting seed over the acre at the rate used in the test above (1.5 lbs. PLS/1000 sq. ft.) would require 65.3 lbs. of PLS. Using the present interseeder, 72 two-inch wide rows running the length of the fairway would be formed creating a total seed bed of 5819.6 sq. ft. At the seeding rate evaluated in this test (2.38 lbs. PLS/1000 sq. ft.), 13.9 lbs. of PLS would be required. A seed savings of 79% is realized using the interseeder compared to a broadcast method. If the interseeder formed rows were seeded at the same rate as the acre that was broadcast (1.5 lbs. PLS/1000 sq. ft.), only 8.7 lbs. of PLS of bermudagrass would be required, an 87% seed savings.

These figures are used to provide a cost comparison for bermudagrass established using a broadcast method and bermudagrass established using the interseeder. Table 2 shows the results assuming 25 total acres of golf course fairways are treated.

TABLE 2

| Method | Area | Total PLS Required (lbs.) | Cost per lb. of PLS | Total Cost |
|---|---|---|---|---|
| Broadcast | 25 acres | 1632 | $27.90 | $45,533.00 |
| Interseeder | 25 acres | 218 | $27.90 | $6,082.00 |

Over $39,000 could be saved in the fairway conversion process using the interseeder apparatus. Also, lost profits are avoided by not having to close the golf course thereby resulting in even greater economic benefit.

We claim:

1. A method of interseeding an area of ground with grass seed, said area having existing vegetation growing thereon, said method comprising the steps of:
   initially tilling said area of ground not theretofore tilled as a part of the method, said initial tilling step comprising the step of contacting said area of ground with a plurality of powered, rotatable blades to form spaced-apart rows in the ground thereby exposing the soil;
   depositing grass seed in the exposed soil of said rows;

compacting said grass seed into the exposed soil; and spraying at least a portion of the existing vegetation adjacent said rows with a herbicide.

2. The method of claim 1, depositing seed by discharging said seed from at least one seed bin through at least one conduit, said at least one conduit having an outlet positioned above at least one of said rows.

3. The method of claim 1, compacting said seed by passing at least one roller in contact with the ground over said rows.

4. The method of claim 1, less than the entire space between adjacent rows being sprayed with a non-selective herbicide.

5. The method of claim 1, said rows being spaced about 4 to about 24 inches apart and up to about 1 inch deep.

6. A method of interseeding an area of ground with grass seed, said area having existing vegetation growing thereon, said method comprising the steps of:

disturbing the ground using a plurality of rotatable cutting devices to form a plurality of spaced-apart rows, each of said rows being between about 0.5 to about 4 inches wide and up to about 1 inch deep, said rows being spaced about 4 to about 24 inches apart;

depositing grass seed into said rows; and passing at least one roller over said rows to compact said grass seed into said rows.

7. The method of claim 6, further including the step of spraying at least a portion of the existing vegetation adjacent said rows with a herbicide.

8. The method of claim 7, said spraying step comprising spraying less than all of the space between adjacent rows with a non-selective herbicide.

9. The method of claim 6, said seed-depositing step comprising the step of discharging said grass seed from at least one seed bin through at least one conduit, said at least one conduit having an outlet positioned above at least one of said rows.

10. The method of claim 6, each of said rotatable cutting devices comprising a blade including a plurality of teeth, at least some of said teeth extending obliquely away from said blade in a first direction, and at least some other of said teeth extending obliquely away from said blade in a second direction different from said first direction.

11. An apparatus for interseeding an area of ground with grass seed, said area having existing vegetation growing thereon, comprising:

a frame having a fore end and aft end and supporting, in serial order from fore to aft, a tillage assembly, a seeding assembly, a roller assembly, and a spray assembly, said tillage assembly consisting essentially of a plurality of laterally spaced-apart, powered, rotatable cutting devices operable to form a plurality of spaced-apart rows in the ground, said seeding assembly including at least one seeder device operable for depositing grass seed in said plurality of spaced-apart rows, said roller assembly including at least one roller aft of each cutting device and operable for compacting said grass seed into the ground, said spray assembly including at least one spray nozzle operable for applying a chemical agent to at least a portion of the ground adjacent said rows.

12. The apparatus of claim 11, each of said rotatable cutting devices comprising a blade including a plurality of teeth, at least some of said teeth extending obliquely away from said blade in a first direction, and at least some other of said teeth extending obliquely away from the plane of said blade in a second direction different from said first direction.

13. The apparatus of claim 11, said seeding assembly comprising at least one grass seed bin coupled to a plurality of conduits respectively extending from said bin to a position aft of each of said rotatable cutting devices.

14. The apparatus of claim 11, said spray assembly including at least one spray nozzle positioned aft of each of said rotatable cutting devices.

15. The apparatus of claim 14, each of said spray nozzles producing a spray pattern that is less than the space between said rows.

16. The apparatus of claim 11 said frame comprising at least two independently shiftable sections, each section including at least one cutting device, at least one seeder, at least one roller and at least one spray nozzle.

17. The apparatus of claim 16, each of said sections further including a motor powering said at least one cutting device located thereon.

18. A method of interseeding an area of ground having existing vegetation growing thereon, said method comprising the steps of:

tilling a plurality of spaced-apart rows in the ground with an apparatus comprising a frame presenting a width defined by a pair of spaced apart side margins, said frame supporting a tillage assembly, a seeding assembly, a roller assembly, and a spray assembly which are disposed within said frame side margins, said tillage assembly comprising a plurality of laterally spaced-apart, powered, rotatable cutting devices, said tilling step comprising contacting the ground with said plurality of powered, rotatable cutting devices and resulting in the disturbance of between about 5% to about 30% of the ground lying within said side margins;

depositing seed in the exposed soil of said rows;

compacting said seed into the exposed soil; and spraying at least a portion of the existing vegetation adjacent said rows with a herbicide.

\* \* \* \* \*